UNITED STATES PATENT OFFICE 2,504,102

METHOD OF REVIVIFYING SULFUR KILLED CATALYSTS

Edward J. R. Sorf, Haddon Heights, N. J., assignor to Socony-Vacuum Oil Company, Incorporated, a corporation of New York No Drawing. Application March 10, 1947, Serial No. 733,726

7 Claims. (Cl. 252—416)

This invention pertains to the treatment of catalysts employed in catalytic hydrocarbon conversion processes. It is specifically concerned with a method for revivifying catalysts which have suffered a loss in activity during use in the conversion of hydrocarbon charge stocks bearing sulfur compounds.

Typical of the conversion processes with which this invention is concerned are the catalytic cracking, reforming, hydrogenation, dehydrogenation, polymerization, aromatization and hydroforming of petroleum fractions either in the vapor or liquid phase. As an example, when hydrocarbon gas oils and the like when contacted in the vapor phase with suitable solid adsorbent catalysts at temperatures of the order of 800° F. and above and at pressures usually above atmospheric, the gas oil charge is converted to lower boiling products containing substantial amounts of gasoline. During the hydrocarbon conversion a certain amount of carbonaceous contaminant is deposited upon the catalyst causing its activity to drop. The carbonaceous contaminant may be removed by burning at controlled temperatures usually of the order of 800° F. to 1200° F. upon which the catalyst cracking activity is substantially restored. In practice these burning regenerations involve the exposure of the catalyst to regeneration periods varying from a few minutes up to a maximum of about one hour.

It has been found that when clay type catalysts are employed for the conversion of hydrocarbon charges containing substantial amounts of sulfur compounds, the catalyst cracking activity gradually decreases to a considerable extent upon its cyclic use and the activity is not restored by the usual contaminant burning regeneration. The catalysts appear to have been gradually poisoned in some manner by the contact at elevated temperature with the sulfur compounds in the charge.

Catalysts which have been found to be susceptible to such sulfur poisoning partake of the form of natural or treated clays and bauxites and the like which are composed mainly of silica, alumina but also contain small percentages of iron and in some instances calcium and magnesium. A typical treated clay is Filtrol clay. The clays may be either in granulated, pelleted or powdered form. It has been found that certain synthetic gel type catalysts which are composed of silica, alumina or both and which contain substantially no iron are not susceptible to sulfur poisoning in catalytic hydrocarbon conversion processes. The term clay type catalysts as used herein in describing and in claiming this invention is employed in a broad sense as excluding such synthetic catalysts which do not contain substantial amounts of iron but as including natural and synthetic silica, alumina or silica-alumina catalysts which do contain substantial amounts of iron.

A major object of this invention is the provision of a method for restoring the activity of catalysts which have suffered substantial loss of activity in use for conversion of sulfur-compound-bearing hydrocarbon stocks at elevated temperatures.

Other objects of the invention will become apparent from the following discussion of the invention.

It has been found that clay type catalysts which have suffered substantial sulfur poisoning in use may be revivified by subjecting them to a temperature of 1050° F. or higher but below the catalyst heat damaging temperature for a period varying upwards from at least 5 hours.

The invention may be most readily understood by reference to an example. A normally-aged acid treated Filtrol clay catalyst in particle form was found to have an initial activity of 32.5 by the following standard test method. A standard East Texas gas oil boiling within the range about 430° F. to 710° F. and having a gravity of about 35.0 A. P. I. was passed in the vapor phase through a bed of the above catalyst at a temperature of 800° F. and at substantially atmospheric pressure and at a space velocity of 1.5 volumes of oil per volume of catalyst per hour and for a period of 10 minutes. The resulting vapor product was continuously withdrawn from the reactor during the entire 10 minutes and condensed at 60° F. to separate the reaction product into liquid "synthetic crude" and gas. The yield of gas and the amount of coke deposited upon the catalyst were determined, and the catalyst was regenerated by burning. The catalyst activity is taken as the 410° F. E. P. gasoline yield expressed as percent volume of the original gas oil charge as determined by distillation of the synthetic crude. This activity test was employed uniformly in all examples given hereinbelow.

The catalyst of 32.5 activity was employed for five cycles. In each cycle the cracking run was conducted at 850° F. and lasted 10 minutes. The charge was an adulterated East Texas gas oil containing 3.5% by weight total sulfur. After each cracking run the catalyst was regenerated by burning of the coke from the catalyst with air while controlling the maximum catalyst temperature below about 1050° F. After 5 cycles the activity of the freshly regenerated catalyst was again determined using the standard East Texas gas oil and was found to be 21.0. The complete catalyst activity data before and after its use for conversion of the sulfur bearing charge are tabulated in Table I.

TABLE

|  | Gasoline, Per Cent Vol. | Coke, Per Cent Wt. | Gas, Per Cent Wt. | Gas Gravity (Dumas) |
|---|---|---|---|---|
| Before Cracking Sour Stock | 32.5 | 2.4 | 3.1 | 1.28 |
| After Cracking Sour Stock | 21.0 | 4.4 | 4.2 | 0.42 |

It will be noted from the table that the sulfur poisoning of the catalyst not only resulted in a marked drop in gasoline yield but also in a marked decrease in the gasoline to coke ratio and in the gasoline to gas ratio.

The following experiments were then conducted on portions of the above described sulfur-poisoned Filtrol catalyst.

Example I

The sulfur-poisoned catalyst was regenerated with air to remove carbonaceous deposit, the maximum temperature being about 1050° F. The regenerated catalyst having an activity of about 21.0 was then maintained as a confined bed at a temperature of about 1050° F. for 24 hours while substantially dry air was passed therethrough at a rate of about one volume per minute per volume of catalyst bed. After the 24 hours the activity of the catalyst was tested and the yields were found to be: gasoline 24.8% by volume, gas 5.1% by weight and coke 3.4% by weight. The gasoline to coke ratio $$\frac{\% \text{ vol. gasoline}}{\% \text{ wt. coke}}$$

had been improved from 4.8 to 7.3.

Example II

A sample of the sulfur-poisoned catalyst after being freed of carbonaceous contaminants and treated with dry air at 1050° F. for 24 hours as in Example I was then maintained as a confined bed at a temperature of about 1400° F. for 5 hours while a stream of dry air was passed therethrough at the rate of one volume per minute volume of bed volume. After the five hour treating period, the catalyst was tested for activity and the following yields based on the charge oil were obtained: gasoline 29.7% by volume, gas 5.4% weight, coke 3.2% weight. The gasoline to coke ratio had been improved from 4.8 to 9.3.

Example III

The experiment of Example II was repeated on another sample of the same sulfur-poisoned catalyst with the exception that the catalyst was maintained at 1400° F. for 10 hours instead of for 5 hours. The following results followed in the activity test on the treated catalyst: gasoline 31.5% by volume, gas 4.7% by weight, coke 2.5% by weight. The gasoline to coke ratio had been improved from 4.8 to 12.6. In this example the activity of the revivified catalyst was 31.5 as compared with 32.5 for the original catalyst before sulfur poisoning.

Example IV

The experiment of Example III was repeated on another sample of the same sulfur-poisoned catalyst with the exception that instead of passing air through the bed maintained at 1400° F., the bed was maintained at 1400° F. for 10 hours in presence of stagnant air. The following yields were obtained from the activity test on the treated catalyst: Gasoline—29.6% by volume, gas 4.9% by weight and coke 2.8% by weight. The gasoline to coke ratio had been improved from 4.8 to 10.5.

Example V

The experiment of Example II was repeated on another sample of the same sulfur-poisoned catalyst except that a stream of nitrogen instead of air was passed through the catalyst while it was maintained at 1400° F. for 10 hours. In the activity test on the treated catalyst the following yields were obtained: gasoline 30.3% by volume, gas 4.3% by weight and coke 3.5% by weight. The gasoline to coke ratio had been improved from 4.8 to 8.7.

From the above examples it will be apparent that clay-type, sulfur-poisoned catalysts may be revivified substantially to original activity by heating at temperatures of the order of 1400° F. for periods of about 10 hours either in the presence of air flow or in the presence of an inert gas or in the presence of no gas flow at all. It will also be apparent that partial revivification of the catalyst may be obtained at a temperature as low as 1050° F. but substantially longer heating periods are required than when the heating is conducted at a higher temperature such as 1400° F.

The invention in its broadest aspects contemplates the heating of the sulfur-poisoned catalyst after regeneration to remove carbonaceous deposits for periods of 5 hours or more at temperatures of the order of 1050° F. or higher. In the preferred form of the invention in order to obtain substantially complete revivification it has been found desirable to heat the sulfur-poisoned clay type catalysts at temperatures of the order of about 1200° F. to 1425° F. for periods of at least 10 hours.

It has been found that when clay type catalysts are heated even in the presence of dry air to temperatures substantially above about 1425° F. a permanent loss in the catalytic activity for hydrocarbon conversion results. This permanent loss of activity is considered to be heat damage. Thus for treatment of catalysts in the presence of dry air or dry gas or air or gas containing only small amounts of water the maximum allowable treating temperature is about 1425° F. On the other hand, if the air should contain about 1.0% by weight water, for example, the maximum allowable treating temperature has been found to be of the order of about 1200° F. It will be understood, of course, that the most suitable treating temperature and period will vary somewhat depending upon the particular catalyst involved and the nature and extent of its sulfur poisoning.

While the catalyst may be revivified to substantially the same extent so far as gasoline yields are concerned, either in the presence of air or of an inert gas such as nitrogen, comparison of Examples IV and V will show that when air is employed better gasoline to coke ratios are obtainable over the revivified catalyst than in the case of an inert gas such as nitrogen or flue gas.

It should be understood that the specific examples given hereinabove are intended merely as illustrations and it is not intended that the invention should be limited thereto or limited otherwise than by the following claims.

I claim:

1. A method for revivifying clay type catalysts which have suffered loss in activity due to use in cyclic hydrocarbon conversion systems wherein it is cyclically contacted with sulfur bearing hydrocarbon reactants and contacted with a combustion supporting gas for removal of carbonaceous contaminants which comprises: subjecting said catalyst after removal of the carbonaceous contaminant deposits thereon by burning to a temperature of at least 1050° F. but less than about 1425° F. for a period of at least 5 hours in an atmosphere of low moisture content.

2. A method for revivifying a clay-type adsorbent material which has incurred loss in activity due to use in treating sulfur bearing hydrocarbons which method comprises: burning the carbonaceous deposits resulting from said hydrocarbon treatment from the adsorbent and then subjecting said adsorbent to temperatures within the range of 1050° F. to 1425° F. for a period of at least about 5 hours in an atmosphere of low moisture content.

3. A method for revivifying a clay-type adsorbent material which has incurred loss in activity due to use in treating sulfur bearing hydrocarbons which method comprises: burning the carbonaceous deposits resulting from said hydrocarbon treatment from the adsorbent and then subjecting said adsorbent to temperatures within the range about 1200° F. to 1425° F. for a period of at least about 10 hours in an atmosphere of low moisture content.

4. A method for revivifying clay type catalysts which have suffered loss in activity due to use in cyclic hydrocarbon conversion systems wherein it is alternately contacted with sulfur bearing hydrocarbon reactants and contacted with a combustion supporting gas for removal of carbonaceous contaminants which comprises: subjecting said catalyst after burning off the carbonaceous contaminant deposits to a temperature within the range 1200° F. to 1425° F. for a period of at least 10 hours in an atmosphere in which the moisture content is less than one percent by weight for temperatures of the order of 1200° F. and substantially zero for temperatures of the order of 1425° F.

5. A method for revivifying a clay-type adsorbent material which has incurred loss in activity due to use in treating sulfur bearing hydrocarbons which method comprises: burning the carbonaceous deposits resulting from said hydrocarbon treatment from the adsorbent and then subjecting said adsorbent to temperatures within the range about 1200° F. to 1425° F. for a period of at least about 10 hours, while passing a stream of air in contact with said adsorbent.

6. A method for revivifying clay type catalysts which have suffered loss in activity due to use in cyclic hydrocarbon conversion systems wherein it is alternately contacted with sulfur bearing hydrocarbon reactants and contacted with a combustion supporting gas for removal of carbonaceous contaminants which comprises: subjecting said catalyst after burning off the carbonaceous contaminant deposits to a temperature within the range 1200° F. to 1425° F. for a period of at least 10 hours, while passing a stream of air in contact with said catalyst.

7. The method for revivifying a clay-type catalyst which has suffered a loss in its activity for a hydrocarbon conversion reaction by use for converting sulfur bearing petroleum fractions to lower boiling fractions at suitable cracking conversion temperatures which comprises: maintaining the catalyst, after burning off the carbonaceous contaminant deposits therefrom, as a bed in a confined zone at a temperature of at least 1050° F. but below about 1425° F. for a period of at least 5 hours while passing air through said bed.

EDWARD J. R. SORF.

REFERENCES CITED

The following references are of record in the file of this patent:

UNITED STATES PATENTS

| Number | Name | Date |
|---|---|---|
| 1,806,020 | Parker et al. | May 19, 1931 |
| 2,388,959 | Drew | Nov. 13, 1945 |
| 2,403,052 | Cole et al. | July 2, 1946 |
| 2,408,996 | Parker et al. | Oct. 8, 1946 |